Jan. 28, 1930.  L. A. CHAPLEAU  1,745,006
FISHING LURE
Filed June 11, 1928
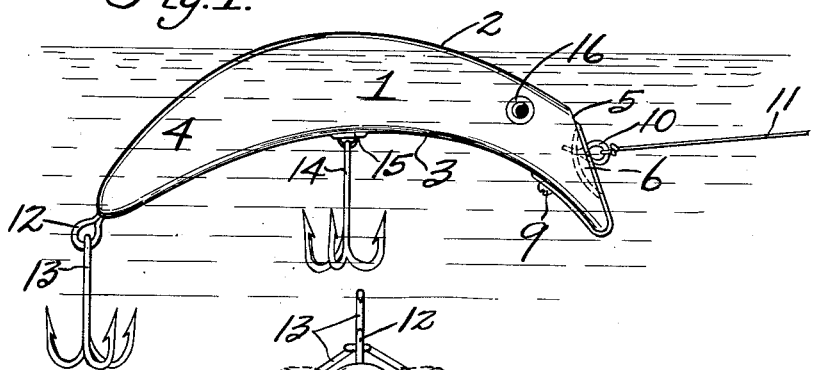
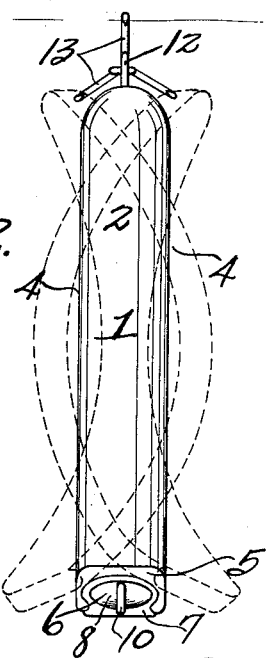
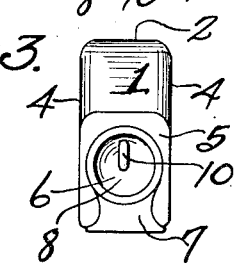
INVENTOR.
Louis A. Chapleau.
BY
ATTORNEY.

Patented Jan. 28, 1930

1,745,006

UNITED STATES PATENT OFFICE

LOUIS A. CHAPLEAU, OF SOUTH BEND, INDIANA, ASSIGNOR TO SOUTH BEND BAIT COMPANY, OF SOUTH BEND, INDIANA

FISHING LURE

Application filed June 11, 1928. Serial No. 284,511.

The invention relates to improvements in fishing lures for game fish such as bass, pike, muscallonge, and the like, and has for its object to provide a lure of this character which will "wobble" from side to side as it is drawn through the water in trolling or casting, and regardless of the speed at which it is drawn through the water, and which will have a pronounced wobbling action when drawn through the water at a very slow speed.

A further object is to provide a lure of this character having an arcuately formed body member which will oscillate from side to side on its horizontal axis as it is drawn through the water, thereby greatly agitating the water.

With the above and other objects in view, the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a side elevation of one form of the lure.

Figure 2 is a plan view of the lure, showing in dotted lines the positions of the lure in the oscillation thereof.

Figure 3 is a front view of the lure.

Refering to the drawing, the numeral 1 designates the body member of the lure which is preferably made of wood or other suitable buoyant material. The body member 1 is arcuately shaped and has its top side 2 and its bottom side 3 curved in the same direction and forming a continuous arc from end to end, said top and bottom sides 2 and 3 tapering toward the rear end of the lure. The sides 4 of the body member 1 are formed on parallel planes, and the body in transverse cross-section is substantially rectangular in shape.

At the forward end of the body 1 is formed a face 5 which is diagonal with respect to the top and bottom sides 2 and 3, and in which face is formed a recess 6. Carried at the forward end 5 of the body is a metal plate 7 having a cupped portion 8 which fits into the recess 6, said plate 7 being secured to the body by means of the screw 9, and the eyelet 10 disposed through the cupped portion 8 of the plate 7. The eyelet 10 also forms means whereby the line 11 may be secured to the lure. Secured at the rear portion of the body 1 is the eyelet 12 which carries the hook 13. In the middle of the under side 3 of the body is disposed another hook 14 which is carried by any suitable carrying member 15 which is secured to the bottom of the body. At the forward end of the body 1, in the opposite sides 4 thereof, are disposed the eyes 16, which together with suitable coloring applied to the body make the lure resemble a small fish. The buoyant material from which the body member of the lure is constructed makes it a surface lure and it will not dive due to its shape unless it is drawn through the water very rapidly.

In the use of this lure, it is found to be very attractive to fish due largely to its wobbling and oscillating action while being drawn through the water. As will be seen from the drawing, the line of draft of the lure is below the center of gravity thereof, thereby making the lure unstable as to balance, and causing the lure to oscillate in a pronounced manner from side to side on its horizontal axis as it is drawn through the water. This unstable condition is partially balanced by the width of the lure, and also by the hooks which tend to act as a balance to prevent the lure from turning bottom side up. The oscillation of the lure, and the curvature thereof presenting varying angular resistance to the water at its forward end, cause it to dart in a rapid manner from side to side even though it be slowly drawn through the water, and the elements of its oscillation, shape, coloring, general appearance, and the agitation of the water which it produces, all tend to make it an attractive lure for fish.

Although my improvement is shown and described as embodied in a floating or surface lure, it is to be understood that the improvement is not limited to surface or floating lures, as the same may be employed as efficiently in connection with underwater or diving lures.

The invention having been set forth, what is claimed as new and useful is:

1. A fishing lure comprising a body having plane sides and curved upper and lower sides forming a continuous arc from end to end thereof, a hook carried by said body, and line attaching means carried by the forward end of said body.

2. A fishing lure comprising an arcuately shaped body having plane sides and arcuately shaped top and bottom faces tapering toward the rear end of the body, a hook carried by said body, and line attaching means carried by the forward end of the body.

3. A fishing lure comprising a body having its upper and lower sides curved in the same direction and forming a continuous arc from end to end of the body, and having its sides formed on parallel planes, the shape of said body in transverse cross section being substantially rectangular, a hook carried by said body, and attaching means for a line carried by the forward end of said body.

4. A fishing lure comprising an arcuately shaped body having plane parallel sides and arcuately shaped top and bottom faces tapering toward the rear end of the body, a forwardly downwardly inclined face formed at the forward end of said body, a hook carried by said body, and line attaching means carried by the body.

5. A fishing lure comprising an arcuately shaped body having plane sides and arcuately shaped top and bottom faces, a hook carried by said body, and line securing means carried by the forward end of said body, the line of draft of said lure being beneath its center of gravity.

6. A fishing lure comprising a body having its sides in planes and curved upper and lower sides forming a continuous arc from end to end thereof, a hook carried by said body, and line attaching means carried by the forward end of said body.

In testimony whereof I affix my signature.

LOUIS A. CHAPLEAU.